3,649,609
FABRICATION OF CARBOXY NITROSO RUBBER EXPULSION BLADDERS
Nathan B. Levine, Colonia, Joseph Green, East Brunswick, and William R. Sheehan, Hopatchong, N.J., assignors to Thiokol Chemical Corporation, Bristol, Pa.
No Drawing. Filed Aug. 21, 1968, Ser. No. 754,488
Int. Cl. C08f 3/24
U.S. Cl. 260—92.1    3 Claims

ABSTRACT OF THE DISCLOSURE

An inert thermoplastic and elastomeric material capable of curing has been provided for preparing molded articles necessitating reworking. This inert elastomeric material is derived from nitroso polymer and is prepared by curing, at elevated temperature, a composition consisting of a nitrosoterpolymer and magnesium oxide. A representative nitrosoterpolymer consists of a polymer derived from trifluoronitrosomethane, tetrafluoroethylene, and a nitrosofluorocarboxylic acid or an ester of the carboxylic acid. The nitroso monomer and/or nitrosofluorocarboxylic acid or ester, such as nitrosodifluoroacetic acid methyl ester make up 50% on mole basis of the monomeric components, the nitrosocarboxylic acid or its ester being about 0.5 to 2% of the total nitroso component because of economical reasons. Before the ester component containing polymer can be used, the ester must be hydrolyzed to the free acid. An elastomeric nitrogen tetroxide storage bladder is a representative molded article prepared from the curable, thermoplastic composition.

---

This invention relates to an inert elastomeric and thermoplastic nitroso rubber composition, more particularly, this invention relates to a curable nitrosoterpolymer-containing composition, the cured composition, and a method for preparing elastomeric, thermoplastic articles from the nitrosoterpolymer-containing composition.

In recent years nitrosopolymer based elastomers or nitroso rubbers have gained wide attention as an exceptionally inert material capable of resisting powerful oxidizers. These oxidizers are invariably extremely aggressive corrodents and, hence, are hard to contain, especially when severe operating conditions are imposed such as for containing propellants in rockets. Moreover, elastomeric expulsion bladders are now believed to be the most promising devices for metering propellants from storage tanks to rocket chambers under zero gravity conditions existing in outer space.

Of the nitroso rubbers, the so-called carboxy nitroso rubber has been a recent development. It is a nitroso rubber derived from trifluoronitrosomethane, tetrafluoroethylene and a nitroso and fluoro moiety containing carboxylic acid. It offers considerable promise as an expulsion bladder material because of very low glass transition temperatures, retaining most of the tensile strength and elasticity even at extremely low temperatures. More importantly, the carboxy nitroso rubber is non-flammable in pure oxygen atmosphere and extremely resistant to other strong oxidizers. Consequently, it is believed that this is the best material for elastomeric expulsion bladders and the only elastomer which, in its cured state, possesses the $N_2O_4$ resistance required for expulsion bladders.

Despite these attractive features of carboxy nitroso rubbers, serious processing problems exist which are obstacles in the way of the fabrication of carboxy nitroso rubber bladders for the above application. Amongst the problems encountered, poor milling and calendering characteristics are prominent (because of excessive tack and "nerve" in the mixed, uncured state; "nerve" being the coiling of the material in three dimensions). While certain curing agents such as epoxides and carboxylic acid salts have been proposed for the carboxy nitroso rubbers, these agents are often suitable only for a one-shot operation, i.e., the first attempt at fabricating an article must be error free. As the cost of the carboxy nitroso rubbers is very high, wastage because of processing problems cannot be tolerated. Hence, it has been a desideratum in this art to find a cure system which would allow the reduction of wastage and at the same time allow unlimited reworking of the molded article.

It has now been found that an elastomeric, vulcanized carboxy nitroso rubber may be obtained which possesses thermoplastic properties when the carboxy nitroso rubber is compounded with magnesium oxide as curing agent.

The curable composition comprises a nitroso terpolymer consisting essentially of trifluoronitrosomethane and a nitrosocarboxylic acid in a mole ratio in percent from 49.99 to 0.01:50, respectively, the nitroso monomers consisting of 50% and tetrafluoroethylene consisting of the other 50%, on mole basis of the polymer. From a practical standpoint, the mole ratio of the nitrosofluorocarboxylic acid ranges from 0.5 to 5 mole percent, preferably from 0.5 to 2 mole percent by weight per 100 percent by weight of the nitrosoterpolymer. Nitrosofluorocarboxylic acids are generally the omega nitrosofluorocarboxylic acids of the general formula $$ON-(CF_2)_nCOOR$$

wherein $n$ is from 1 to 5 and R is H or lower alkyl. Representative acids are nitrosodifluoroacetic acid, nitrosotetrafluoropropionic acid, nitrosohexafluorobutyric acid, nitroso octafluorovaleric acid, etc. Before the ester containing polymer may be used, it must be hydrolyzed to the acid in conventional manner. In order to obtain ready curing, magnesium oxide is used in as fine form as possible.

In addition to the above components, the uncured nitrosoterpolymer composition may contain additives common to the nitroso rubber art such as fine particle size silica coated with 10% by weight of silicone oil.

Curing of the nitrosoterpolymer is effected by heating an article in a mold at 200° F. for about 60 minutes. Thereafter, the article may be cooled. If there is a need to rework the same article, then it may be heated up to 250° F. or until a reasonably thermoplastic state is achieved and then the article can be reworked a number of times. Whereas the carboxy nitroso terpolymers with epoxide or chormium triperfluoroacetic acid curing agents yield thermosetting vulcanizates, it is believed that the magnesium oxide cured elastomer may undergo an unlimited number of heating and cooling cycles without loss of thermoplasticity.

Magnesium oxide curing agent which is used to obtain thermoplastic elastomer is employed as a fine particulate material of a 200 mesh size and finer in a stoichiometric amount corresponding to the carboxylic acid groups present in the nitroso polymer. An excess of about 10 to 15% of magnesium oxide may be used although even higher amounts of it may be used, i.e., a total of 0.5 to 25 parts of MgO per 100 parts of polymer, the excess being merely a filler.

To illustrate the novel thermoplastic composition as well as the method of working up nitroso rubber articles, the following examples are offered for purposes of illustration and not to limit the invention.

EXAMPLE

The following formulation was used for the fabrication of six-inch diameter spherical bladders from carboxy nitroso polymers. The composition of the elastomer was as follows:

| | Parts by weight |
|---|---|
| Carboxy nitroso terpolymer [1] | 100 |
| Silstone 110 [2] | 20 |
| Magnesium oxide | 0.5 |

[1] $CF_3NO/ON(CF_2)_3COOH/C_2F_4$—The terpolymer which was used contained about 1.5 mole percent acid termonomer.
[2] Silica coated with 10% by weight of silicone oil derived from low molecular weight dimethyl siloxane.

Mechanical properties of the above-described material were determined according to standard ASTMS tests for the cured material and are as follows:

| | At room temperature | At 165° F. | At 165° F.* |
|---|---|---|---|
| Tensile strength (p.s.i.) | 3,000 | 840 | 460 |
| Elongation, percent | 650 | >950 | 275 |
| 200% modulus (p.s.i.) | 1,500 | 360 | 410 |
| Shore A Hardness (in points) | 75 | | |

*After $N_2O_4$ immersion of 7 days at 165° F.

Shaping and curing of the above composition was achieved as follows. The ingredients were mixed together on a 3" x 8" two roll rubber mill and blended untill a well-dispersed mixture was achieved. A solid, shapeless portion (about 10% excess elastomer by volume) of the compound was then placed in the female cavity of a male-female compression mold. The male section was inserted and the mold was heated to 200° F. for about 60 minutes with approximately 60 tons of force applied to mold and cure semi-hemispherical sections. Two sections, thus formed, were placed on a cast, water soluble mandrel (e.g. Paraplast, Corbinite, salt, or a polyvinyl alcohol-and mixture) which mandrel was washed out with water after fabrication of the bladder. The hemispheres were layed up with a narrow-overlapping seam which was eliminated by tightly wrapping the bladder girth (seam area) with wet nylon tape. The entire assembly was then heated in an oven at 250° F. The elevated temperature and the high compression hoop load of the tape caused the rubber to flow together at this point, thereby eliminating the seam. This wrapping procedure leaves a matted tape impression on the finished bladder; a spring steel band, wide enough to cover the seam, can be used in place of the tape to form a more uniform seam and eliminate the tape marks.

Elongated bladders can be fabricated in three sections; two hemispherical end caps and a cylindrical center section. The end caps can be compression molded as described above and the cylindrical section can be cut to size from a molded carboxy nitroso rubber sheet of the required thickness. The three sections can be layed up on a mandrel with the longitudinal seam overlapped. The entire length of the cylincrical section can be tape-wrapped or enclosed in a steel band. The seams can then be molded together as described previously.

The above example and working embodiments are not to be construed as defining the limits of the invention; the metes and bounds of this invention are best defined by the claims which follow.

What is claimed is:

1. An inert, curable composition comprising (a) a nitrosoterpolymer consisting essentially of trifluoronitrosomethane, in a mole percent ratio from 49.99 to 0.01 percent, tetrafluoroethylene in a mole percent ratio of 50% and a nitrosofluorocarboxylic acid of 2 to 6 carbon atoms in a mole percent ratio from 0.01 to 49.99% and (b) from 0.5 to 25 parts of magnesium oxide per 100 parts of polymer.

2. The composition according to claim 1 wherein the nitrosoperfluorocarboxylic acid present in the terpolymer is nitrosohexafluorobutyric acid in a range from 0.5 to 2 mole percent.

3. A cured thermoplastic, elastomeric composition according to claim 1.

References Cited

UNITED STATES PATENTS

| 2,724,707 | 11/1955 | Brown | 260—41 B |
| 3,321,454 | 5/1967 | Crawford et al. | 260—92.1 |
| 3,367,903 | 2/1968 | Deis et al. | 260—41 B |
| 3,417,068 | 12/1968 | Knoll | 260—92.1 |

HARRY WONG, Jr., Primary Examiner

U.S. Cl. X.R.

260—29.1, 41; 264—294, 331